(12) United States Patent
Yiu et al.

(10) Patent No.: US 10,080,153 B2
(45) Date of Patent: Sep. 18, 2018

(54) DEVICE AND METHOD FOR MODIFYING CELL MEASUREMENTS BASED ON DEVICE MOBILITY

(71) Applicant: Intel IP Corporation, Santa Clara, CA (US)

(72) Inventors: Candy Yiu, Portland, OR (US); Yang Tang, Pleasanton, CA (US); Rui Huang, Beijing (CN); Yujian Zhang, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/119,086

(22) PCT Filed: Mar. 13, 2015

(86) PCT No.: PCT/US2015/020385
§ 371 (c)(1),
(2) Date: Aug. 15, 2016

(87) PCT Pub. No.: WO2015/138859
PCT Pub. Date: Sep. 17, 2015

(65) Prior Publication Data
US 2016/0360438 A1 Dec. 8, 2016

Related U.S. Application Data

(60) Provisional application No. 61/953,632, filed on Mar. 14, 2014.

(51) Int. Cl.
*H04W 24/00* (2009.01)
*H04W 24/10* (2009.01)
(Continued)

(52) U.S. Cl.
CPC .......... *H04W 24/10* (2013.01); *H04W 48/20* (2013.01); *H04W 64/00* (2013.01); *H04W 24/00* (2013.01)

(58) Field of Classification Search
CPC ..... H04W 24/10; H04W 48/20; H04W 64/00; H04W 24/00
(Continued)

(56) References Cited

U.S. PATENT DOCUMENTS

2004/0204184 A1 10/2004 Lin
2008/0219208 A1 9/2008 Adams et al.
(Continued)

FOREIGN PATENT DOCUMENTS

CN 106465163 A 2/2017
WO WO-2011069550 A1 6/2011
(Continued)

OTHER PUBLICATIONS

"International Application Serial No. PCT/US2015/020385, International Search Report dated Jun. 19, 2015", 9 pgs.
(Continued)

*Primary Examiner* — Mong-Thuy Tran
(74) *Attorney, Agent, or Firm* — Schwegman Lundberg & Woessner, P.A.

(57) ABSTRACT

User Equipment (UE), computer readable media, and methods to modify communication channel measurement timing based on a mobility of the UE are disclosed. The UE may include circuitry configured to determine a plurality of signals from one or more cells, determine a first value for a first performance metric associated with a first cell of the one or more cells, wherein the first value is determined from a first measurement, select the first cell for a first communication based on the first value, determine first location information associated with the UE, determine, following
(Continued)

the first measurement and using the first location information, that the UE is stationary, and delay, in response to the determination that the UE is stationary, a second measurement of the first performance metric. In various alternate embodiments, different measurement types may be used for mobility and channel quality determinations. In further embodiments, only measurements for unused channels may be delayed.

25 Claims, 8 Drawing Sheets

(51) Int. Cl.
*H04W 48/20* (2009.01)
*H04W 64/00* (2009.01)

(58) Field of Classification Search
USPC .................................. 455/456.1–456.6, 457
See application file for complete search history.

(56) References Cited

U.S. PATENT DOCUMENTS

| | | | | |
|---|---|---|---|---|
| 2009/0316655 A1* | 12/2009 | Prakash | ............ | H04W 36/0088 370/331 |
| 2010/0124934 A1 | 5/2010 | Mach | | |
| 2010/0304761 A1 | 12/2010 | Seibert et al. | | |
| 2012/0108199 A1* | 5/2012 | Wang | ................... | H04W 24/10 455/405 |
| 2012/0169535 A1* | 7/2012 | Kong | .................... | G01S 19/246 342/357.49 |
| 2012/0264476 A1* | 10/2012 | Kleinhenz | ............. | H04L 1/0026 455/517 |
| 2012/0307791 A1* | 12/2012 | Veres | ................... | H04W 36/32 370/331 |
| 2013/0215736 A1* | 8/2013 | Han | ....................... | H04L 5/001 370/216 |
| 2013/0225177 A1* | 8/2013 | Wegmann | ............. | H04W 36/30 455/437 |
| 2013/0303231 A1 | 11/2013 | Yiu et al. | | |
| 2013/0310058 A1 | 11/2013 | Ibrahim et al. | | |
| 2014/0065974 A1* | 3/2014 | Sane | ................. | H04W 52/0254 455/67.11 |
| 2014/0184440 A1* | 7/2014 | Park | ...................... | H01Q 25/04 342/351 |
| 2014/0242989 A1* | 8/2014 | Cai | ....................... | H04W 52/54 455/436 |
| 2014/0269356 A1* | 9/2014 | Lai | .................... | H04W 36/0088 370/252 |
| 2014/0274049 A1* | 9/2014 | Singh | ................ | H04W 36/0083 455/436 |
| 2015/0264620 A1* | 9/2015 | Timus | ................... | H04W 36/32 455/440 |

FOREIGN PATENT DOCUMENTS

| | | |
|---|---|---|
| WO | WO-2012034583 A1 | 3/2012 |
| WO | WO-2013144433 A1 | 10/2013 |
| WO | WO-2014035867 A1 | 3/2014 |
| WO | WO-2015138859 A1 | 9/2015 |

OTHER PUBLICATIONS

"International Application Serial No. PCT/US2015/020385, Written Opinion dated Jun. 19, 2015", 9 pgs.
"Chinese Application Serial No. 201580008462.0, Office Action dated Aug 29, 2016", (With English Translation), 5 pgs.
"Chinese Application Serial No. 201580008462.0, Voluntary Amendment Filed on Jun. 8, 2017", (W/ English Translation), 14 pgs.
"Core Network assistance information", 3GPP TSG-RAN WG2 Meeting #85, R2-140539, (Jan. 31, 2014).
"European Application Serial No. 15761698.8, Extended European Search Report dated Sep. 14, 2017", 11 pgs.
"International Application Serial No. PCT/US2015/020385, International Preliminary Report on Patentability dated Sep. 22, 2016", 11 pgs.
"Korean Application Serial No. 10-2016-7022038, Notice of Preliminary Rejection dated Oct. 13, 2017", W/ English Translation, 13 pgs.
"Korean Application Serial No. 10-2016-7022038, Office Action dated Apr. 24, 2017", W/ English Translation, 14 pgs.
"Korean Application Serial No. 10-2016-7022038, Response Filed Jun. 23, 2017 to Office Action dated Apr. 24, 2017", (W/ English Claims), 27 pgs.

\* cited by examiner

US 10,080,153 B2

DEVICE AND METHOD FOR MODIFYING CELL MEASUREMENTS BASED ON DEVICE MOBILITY

PRIORITY CLAIM

This application is a U.S. National Stage Filing under 35 U.S.C. 371 from International Application No. PCT/US2015/020385, filed Mar. 13, 2015 and published in English as WO 2015/138859 on Sep. 17, 2015, which claims the benefit of priority to U.S. Provisional Patent Application Ser. No. 61/953,632, filed Mar. 14, 2014, each of which is incorporated herein by reference in its entirety for all acceptable purposes.

TECHNICAL FIELD

Embodiments pertain to wireless communications. Some embodiments relate to determining a motion of user equipment in cellular networks, such as Long-Term Evolution (LTE) networks, and for use of such determinations to modify or delay certain measurements and associated cell selections. Some embodiments relate to sending and receiving a mobility of user equipment. Some embodiments relate to taking actions based on the mobility of the user equipment.

BACKGROUND

A user equipment (UE) operating in cellular network, such as an LTE network or LTE-A network, may have access to multiple cells for wireless communication. Cell selection may be based on periodic measurements of signal characteristics for communication channels with each cell. Such measurements, particularly as the number of available cells increases, may consume significant battery and signaling resources. Embodiments described herein related to improved systems and methods for measuring signals and selecting cells.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
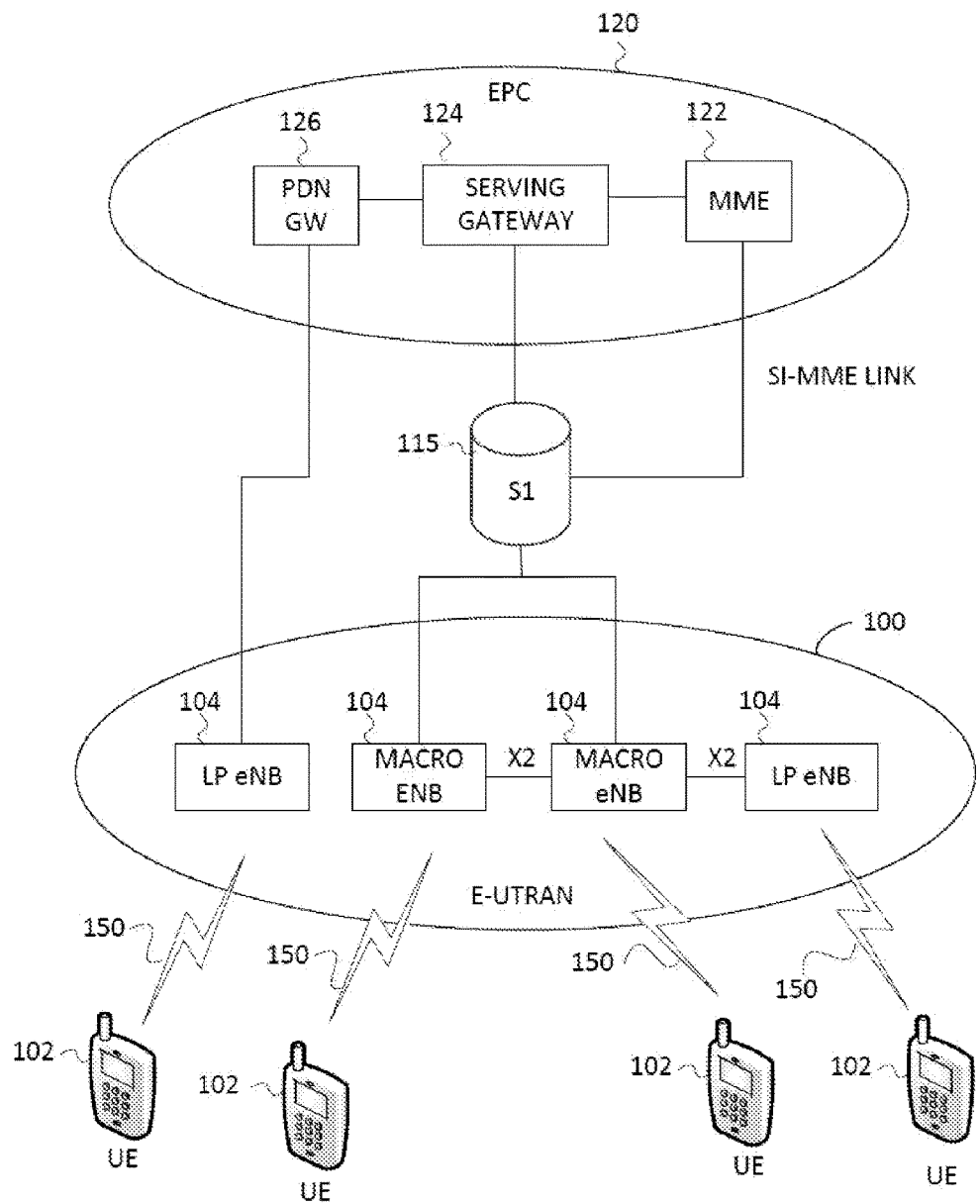
FIG. 1 shows a portion of an end-to-end network architecture of an LTE network with various components of the network in accordance with some embodiments.

FIG. 1 shows a portion of an end-to-end network architecture of an LTE network with various components of the network in accordance with some embodiments. The network comprises a radio access network (RAN) 100 (e.g., as depicted, the E-UTRAN or evolved universal terrestrial radio access network) and the core network 120 (e.g., shown as an evolved packet core (EPC)) coupled together through an S1 interface 115. For convenience and brevity's sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes enhanced node Bs (eNBs) 104 (which may operate as base stations) for communicating with the UE 102. The eNBs 104 may include macro eNBs and low power (LP) eNBs. The UE 102 and eNBs 104 are transmitting and receiving communications 150.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the core network 120 (an EPC network here) and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including, but not limited to, RNC (radio network controller functions) such as radio bearer management, uplink and downlink dynamic radio resource management or control (RRC) and data packet scheduling, and mobility management. In some cases the RRC functions are handled by another part of the RAN 100. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 100 and the core network 120, which may be an EPC network. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells may be used to extend coverage to indoor areas where outdoor signals do not reach well, or to add network capacity or increase data rates. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, an LP eNB might be a femtocell eNB since it is coupled through the PDN GW 126. Similarly, a picocell is a wireless communication system typically covering a small area, such as in-building (offices, shopping malls, train stations, etc.), or more recently, in-aircraft. A picocell eNB can generally connect through the X2 link to another eNB, such as a macro eNB, through its base station controller (BSC) functionality. Thus, an LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In certain implementations, cell coverage in RAN 100 may overlap significantly between different eNBs 104. For example, a picocell may have a coverage area that is entirely within the coverage area of a macrocell. Other cells may overlap only in certain areas with other cells. This overlap in cell coverage not only enables handoff between cells, but may provide additional capacity when one eNB 104 is overloaded and another eNB 104 is available.

In accordance with some embodiments, the UE 102 and eNB 104 may be configured for one or more of the example embodiments described herein for determining the mobility of the UE 102. The UE 102 and/or eNB 104 may also be configured to report and receive the mobility of the UE 102 as well as to perform actions based on the mobility, such as enhanced signaling, if the UE 102 is mobile prior to a handover. As described in detail below, when a UE 102 is operating within the cell coverage area of multiple eNBs 104, the UE 102 may perform signal quality measurements on different frequencies provided by the different eNBs 104 in order to determine, at least in part, which eNB 104 to use. Repeated signal quality measurements on multiple channels may use significant amounts of UE 102 battery power and communication channel capacity. If a UE 102 is in a low-mobility or "stationary" state, then the quality of available channels is unlikely to change. A mobility measurement may thus be used to delay channel quality measurements after an initial set of measurements and a channel selection. This delay of channel quality measurement may be applied to all available channels, or only to available channels that were not selected following an initial set of measurements.

Figure 2:
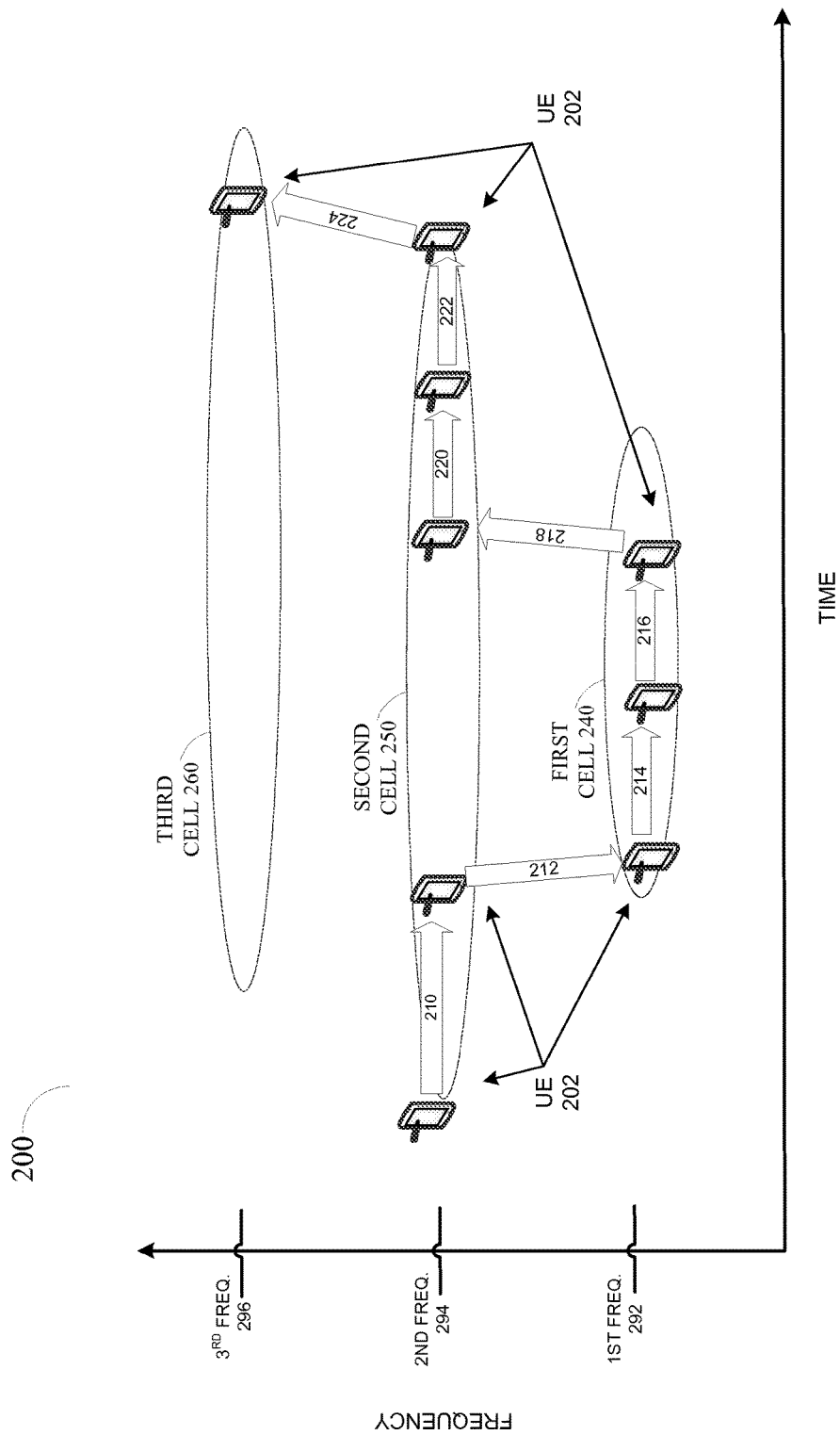
FIG. 2 illustrates example aspects of device handoff between cells operating at different frequencies with measurement and/or delay periods according to some embodiments.

FIG. 2 illustrates example aspects of device handoff between cells operating at different frequencies with measurement and/or delay periods according to some embodiments. FIG. 2 illustrates an example embodiment of system operation 200 showing UE 202 operation and handoff over time between multiple cells operating at different frequencies. In system operation 200, three cells are illustrated as first cell 240, second cell 250, and third cell 260. Each cell may be associated with a single eNB 104. For example, in one embodiment, first cell 240 may be associated with a LP eNB picocell operating at a first frequency 292, second cell 250 may be associated with a first macrocell eNB operating at a second frequency 294, and third cell 260 may be associated with a second macrocell eNB operating at a third frequency 296. In other embodiments, a single eNB may be associated with multiple cells operating at different frequencies, such that, for example, second cell 250 and third cell 260 may be part of a single eNB having circuitry for operation at multiple frequencies.

System operation 200 of FIG. 2 then illustrates UE operation as shown during different operating periods. During operation 210, UE 202 operates at second frequency 294 using second cell 250. During operation 212, UE 202 transitions from second cell 250 to first cell 240. During operations 214 and 216, UE 202 operates at first frequency 292 using first cell 240. During operation 218, UE 202 transitions back to second cell 250 from first cell 240. During operations 220 and 222, UE 202 operates at second frequency 294 on second cell 250. At operation 224, UE 202 transitions to third cell 260 from second cell 250. The cell may then operate at third frequency 296 of third cell 260, or transition to either second frequency 294, first frequency 292, or any other available frequency.

As illustrated by FIG. 2, UE 202 may be presumed to have an option to use any of the frequencies 292, 294, and 296 from the end time period of operation 210 through the middle of operation 220 based on the illustrated cell overlap. In order to determine which cell of first cell 240, second cell 250, or third cell 260 to use, a signal measurement may be made from the UE to each cell. This may include measurements of signals such as a reference signal receive power (RSRPs), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI) Such measurements may be resource intensive, particularly for regularly repeated measurements. In one embodiment, if measurements are taken every 40 milliseconds, throughput in LTE system operation may be degraded by 15% or more.

Mobility information of UE 202, however, may be used to delay or otherwise modify such repeated measurements. For example, if the mobility information indicates that UE 202 is "stationary," then the system may assume that measurements associated with the cells 240, 250, and 260 are unlikely to change. The "stationary" determination, as described herein, may refer to a measurement of device position made using network signals, a measurement of device acceleration or velocity, a series global positioning system calculations made from satellite reference signals, a Doppler measurement of signals to one or more stationary cell antennas, or any other such measurement that may be used to determine location or movement information for UE 202. Stationary does not necessarily mean zero movement, but may refer to movement within a threshold distance or movement value of an original position of UE 202, or may refer to movement within a geofence or boundary associated with a selected cell. In certain embodiments, such geofence or boundary information may be stored at a controlling network element such as MME 122, and may be used by the controlling network element along with mobility information from UE 102 to select measurement timing modification or delays as described below.

Based on a determination or series of ongoing determinations using such location information for UE 202, the UE 202 or a network involved with system operation 200 may delay or modify channel quality measurements. In certain embodiments, this modification may involve a hold on all channel quality measurements while the UE 202 is stationary, with standard periodic measurements resumed when UE 202 is no longer stationary. In other embodiments, the modification may be that the time between regular measurements of all channels is extended, but not completely paused.

In further embodiments, this modification may involve a hold on quality measurements for non-selected frequencies, with measurements resuming when UE 202 is no longer stationary. For example, if UE 202 is determined to be stationary during operation 214, then a signal quality to first cell 240 on frequency 292 may continue, but measurements of second frequency 294 to second cell 250 and third frequency 296 to third cell 260 may be delayed and not performed during the time of operation 214. If UE 202 exceeds the movement threshold during operation 216, then measurement for all channels including the frequencies 292, 294, and 296 may occur periodically during operation 216. A handover from first cell 240 to second cell 250 may then occur in operation 218 when the measured channel quality or any other such criteria for handover cause system operation 200 to move UE 202 from first cell 240 to second cell 250. In certain embodiments, a channel quality for the channel in use may have an associated threshold when the measurements for the channels not in-use are paused. If the channel quality for the in-use channel drops below the threshold while the UE 202 is stationary, then regular periodic measurement of all channels may resume even though UE 202 is stationary.

Figure 3:
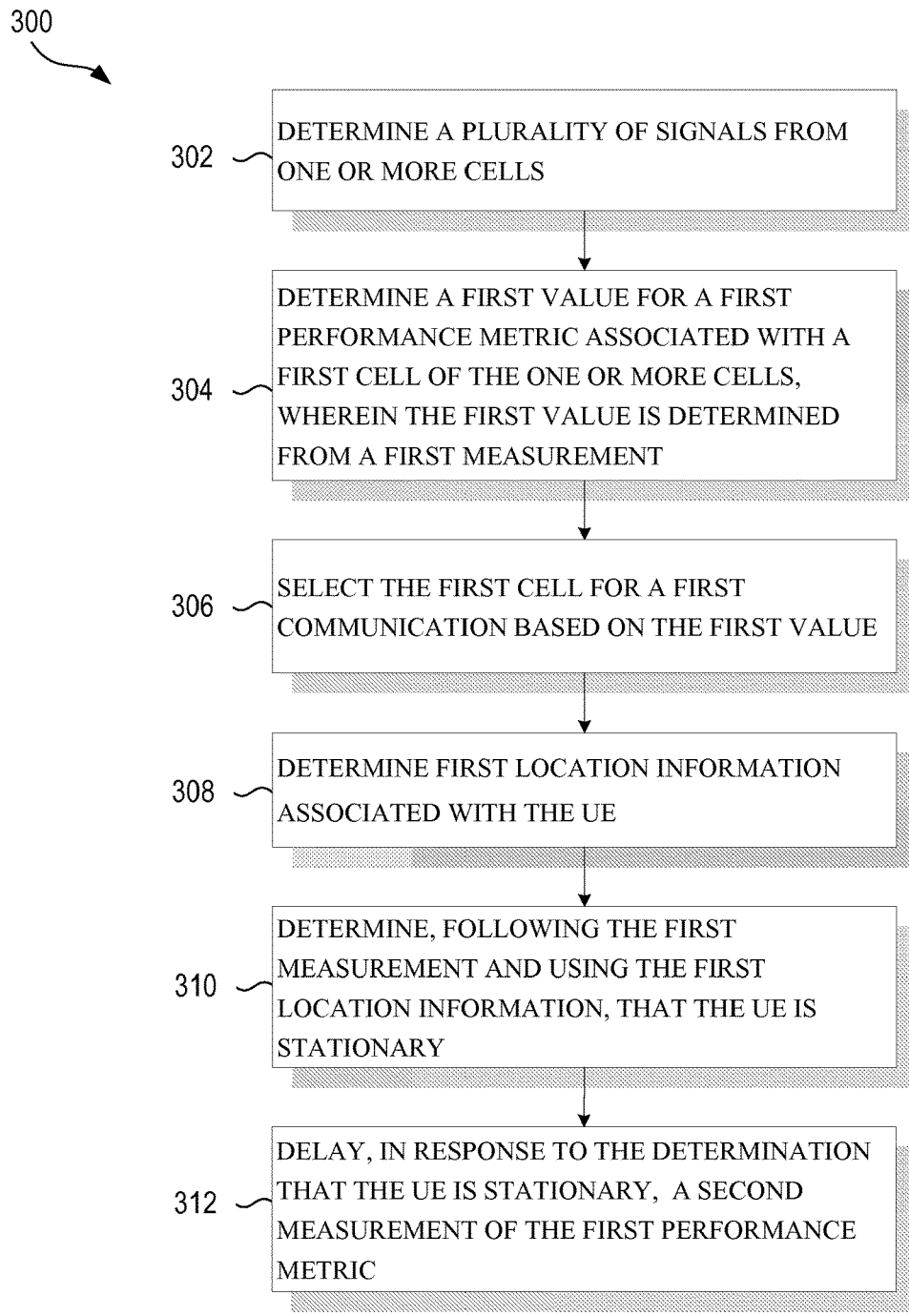
FIG. 3 illustrates one example method of modifying cell measurements based on device mobility according to some embodiments.

FIG. 3 illustrates one example method of modifying cell measurements based on device mobility according to some embodiments. FIG. 3 then illustrates one example embodiment of a method, shown as method 300. For simplicity, method 300 is described within the context of system operation 200 (FIG. 2). For example, method 300 may be performed by UE, such as UE 102 (FIG. 1), although this is not a requirement. It will be apparent that other systems and network structures may be used to implement method 300.

Method 300 with operation 302 where a plurality of signals from one or more eNB associated cells are determined Such a determination may be done using channel or signal identification processes are part of eNB discovery. In operation 304, a first value for a first performance metric is determined. The first value is associated with a first cell of the one or more cells, wherein the first value is determined from a first measurement. Such a measurement may be any measurement described herein such as an RSSI, SNR, or other signal measurement. The measurement may be performed by UE 202 in communication with the first cell 240, by the first cell 240 in communication with UE 202, or by any other element of a RAN 100 using data from signals between UE 202 and the first cell 240. In various embodiments, such measurements may be performed for any number of additional cells or signals in communication with UE 202 in addition to the measurement for a first signal and the first cell 240.

In operation 306, the signal quality value determined from the measurement is used to select the first cell for a first communication based on the first value. In addition to signal quality values, other information such as location information, cell or eNB loads from other users, or any other such metrics may be part of selection of the first cell. Such a decision may additionally involve processing decisions made by UE 202, a processor associated with the eNB of the first cell, another element of a RAN 100, or any combination of these.

In operation 308, first location information associated with the UE 202 is determined Such location information may be gathered from sensors of UE 202 such as accelerometers or any other such UE based sensors. Such location information may be gathered based on network communications with any eNB, including communications with the first cell 240. Such location information may also be based on global positioning system (GPS) location determinations. In various embodiments, combinations of any of these may be used with any other location determinations or information as part of the first location information. Then, in operation 310, following the first measurement and using the first location information, a determination is made that the UE is stationary. Based on this determination in operation 308, a second measurement of the first performance metric is then delayed as part of operation 312.

In various embodiments, the determination that UE 202 is stationary and a subsequent delay in the second measurement for an update of channel quality information may be performed in different ways. For example, if the location information comprises Doppler measurements, the system may relax measurement requirements when the Doppler measurement is below a threshold value for a configurable window of time. The system may then allow the UE to stop performing channel quality measurements if the Doppler measurement has been below the threshold value for within the window of time.

In other embodiments, the UE may measure the location information such as Doppler measurements, and may send the measurements or a status indicator to another element of an eNB 104, RAN 100, or any other controlling element of the system. This communication may occur via the connection with the first cell 240 on the first frequency 292. The controlling element can then reconfigure a measurement pattern and set new measurement timing in communication with UE 202. This may be achieved by adding a signaling event for stationary reporting as part of system operation. In certain embodiments, the stationary status may be part of regular periodic signaling in an updated LTE system. In certain embodiments, this may be a system option that is used by the system as necessary for resource allocation and use. In certain embodiments, stationary indicators and measurement timing may be communicated as mobility information as part of the LTE system. In some embodiments, the stationary indicator or use of location information can be set as an option by RAN 100 or another element of the system, with the UE 202 periodically determining a stationary status. Once the stationary status is identified by UE 202, this is sent to the controlling system element. If the UE 202 becomes mobile again, a change of status indicator may be sent to the controlling element of the network. Upon every change of status indicator, a controlling element of the network such as MME 122 may communicate with UE 202 to updating the timing of channel measurements.

In addition to embodiments where the network determines measurement delays, certain embodiments may also use network resources to assist with stationary status determinations. Such systems may operate with UE 202 sending location information to a controlling system element such as MME 122. Such embodiments may particularly operate where the system has location or geofence information associated with a particular cell, and where the stationary status may be determined using information about cell or RAN 100 based location measurements and information.

In certain embodiments, an LTE network can configure a parameter scale based on UE 202 mobility. For example, if the UE 202 is in a low mobility or stationary state, a first measurement modification structure may be used for the second measurement and subsequent measurements. If the UE 202 is in a medium mobility state, between a first and second threshold value, a second measurement modification structure may be used. If the UE 202 is in a high mobility state, no measurement modification may be used. In other embodiments, any other such sets of measurement modifications in any number of variable or tiered structure may be used. In certain embodiments, for example, an average velocity over time for UE 202 may be used as a scaling value for a time delay between the first measurement and the second measurement, with the delay increasing as the velocity is closer to zero.

Figure 4:
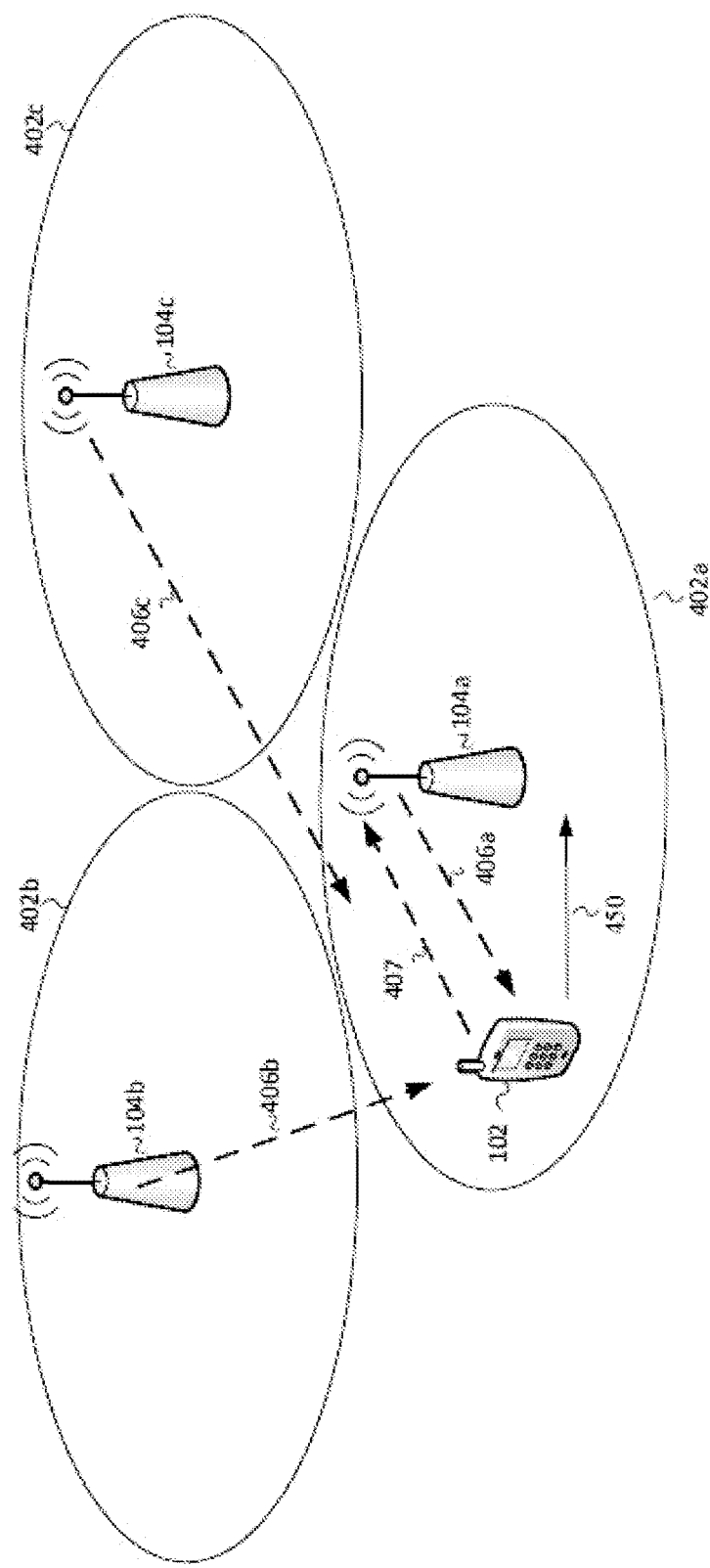
FIG. 4 illustrates mobility of a UE in accordance with some embodiments.

FIG. 4 illustrates mobility of a UE in accordance with some embodiments. FIG. 4 illustrates one example embodiment for a determination of location information described above. In FIG. 4, the speed 450 of a UE 102 or UE 202 is determined in accordance with some embodiments, and may be used as location information in method 300 above, or in any other such methods. Illustrated in FIG. 4 are eNBs 104a, 104b, 104c; cells 402a, 402b, 402c; a UE 102; the speed 450 of the UE 102; signals 406a, 406b, 406c; and signals 407. The cells 402 may be cells of a Long-Term Evolution wireless network. Cell 402a may be a serving cell for the UE 102. Cells 402b, 402c may be neighboring cells. Signals 406a, 406b, 406c may be signals transmitted from the eNBs 104a, 104b, 104c, respectively. The signals 406a, 406b, 406c, 407 may include signals transmitted by the eNBs 104a, 104b, 104c and/or the UE 102. The eNBs 104a, 104b, 104c may transmit signals 406a, 406b, 406c that are measured at the UE 102 such as reference signal receive power (RSRP), reference signal receive quality (RSRQ), received signal strength indicator (RSSI), signal-to-noise ratio (SNR), signal-to-interference-ratio (SIR), signal-to-interference-plus-noise ratio (SINR), and channel quality indication (CQI).

An example signal 406a, 406b, 406c is RSRP, which may be the average power of Resource Elements (RE) that carry serving cell 402a-specific Reference Signals (RS) over the entire bandwidth, so that RSRP may be only measured in the symbols carrying RS. The UE 102 may be attached to eNB 104a. The UE 102 may receive signals 406b, 406c from one or more neighboring eNBs 104b, 104c, respectively. The UE 102 may send signals 407 to the eNB 104a.

The speed 450 of the UE 102 may indicate the motion of the UE 102. For example, the speed 450 may be a velocity that includes an x, y, and z component. The speed 450 may be used to determine whether the UE 102 is stationary. The UE 102 and/or eNB 104a may be configured to determine whether the UE 102 is stationary. In example embodiments, the eNBs 104a, 104b, 104c may be other access points to a wireless network. For example, the eNBs 104a, 104b, 104c may be Institute of Electrical and Electronic Engineers (IEEE) 802.11 access points or stations, IEEE 802.15, a base station configured for global system for mobile communications (GSM), enhanced data rates for GSM evolution (EDGE), or GSM/EDGE RAN (GERAN).

In certain embodiments, a variance of reference signal receive power (RSRP) for different speeds 450 of the UE 102 in accordance with some embodiments. Multiple variance determinations may be based on a window of samples of RSRP. For example, there may be 100 samples of RSRP taken as a window size. The variance may be determined according to Equation (1).

$$\text{Variance} = \frac{\sum_{k=0}^{n} x^k - \bar{x}}{n-1}. \qquad \text{Equation (1)}$$

In Equation (1), n is the number of samples; x is the RSRP; and, $\bar{x}$ is the mean of RSRP measurements. The UE 102 and/or eNB 104 may determine the variance based on Equation (1). The UE 102 and/or eNB 104 may use a fixed window of size n, or a variable window based on a condition such as based on changes to RSRP above a threshold.

A standard deviation of RSRP for different speeds of the UE 102 may be used with stationary determinations or UE mobility determinations. The standard deviation may be determined according to Equation 2.

$$\text{Standard Deviation} = \sqrt{\text{Variance}}. \qquad \text{Equation (2):}$$

In Equation (2), the variance may be determined using Equation (1). The UE 102 and/or eNB 104 may determine the standard deviation based on Equation (2). The UE 102 and/or eNB 104 may use a fixed window of size n, or a variable window based on a condition such as based on changes to RSRP above a threshold.

This may then be used to determine confidence intervals associated with location information for a UE such as UE 102 or UE 202. These confidence intervals may further be used in stationary device state determinations or other UE mobility determinations. For example one confidence interval (CI) of RSRP may be determined according to Equation (3).

$$CI = t_{n-1} \frac{\text{Standard Deviation}}{\sqrt{n}}. \qquad \text{Equation (3)}$$

In Equation (3), CI is confidence interval; n is the sample size; $t_{n-1}$ is the critical value for the confidence level for the p % from the t-distribution with n−1 degrees of freedom. The CI of RSRP may be determined using Equation (3). The UE 102 and/or eNB 104 may determine the CI of RSRP based on Equation (3). The UE 102 and/or eNB 104 may use a fixed window of n, or a variable window based on a condition such as based on changes to RSRP above a threshold.

Figure 5:
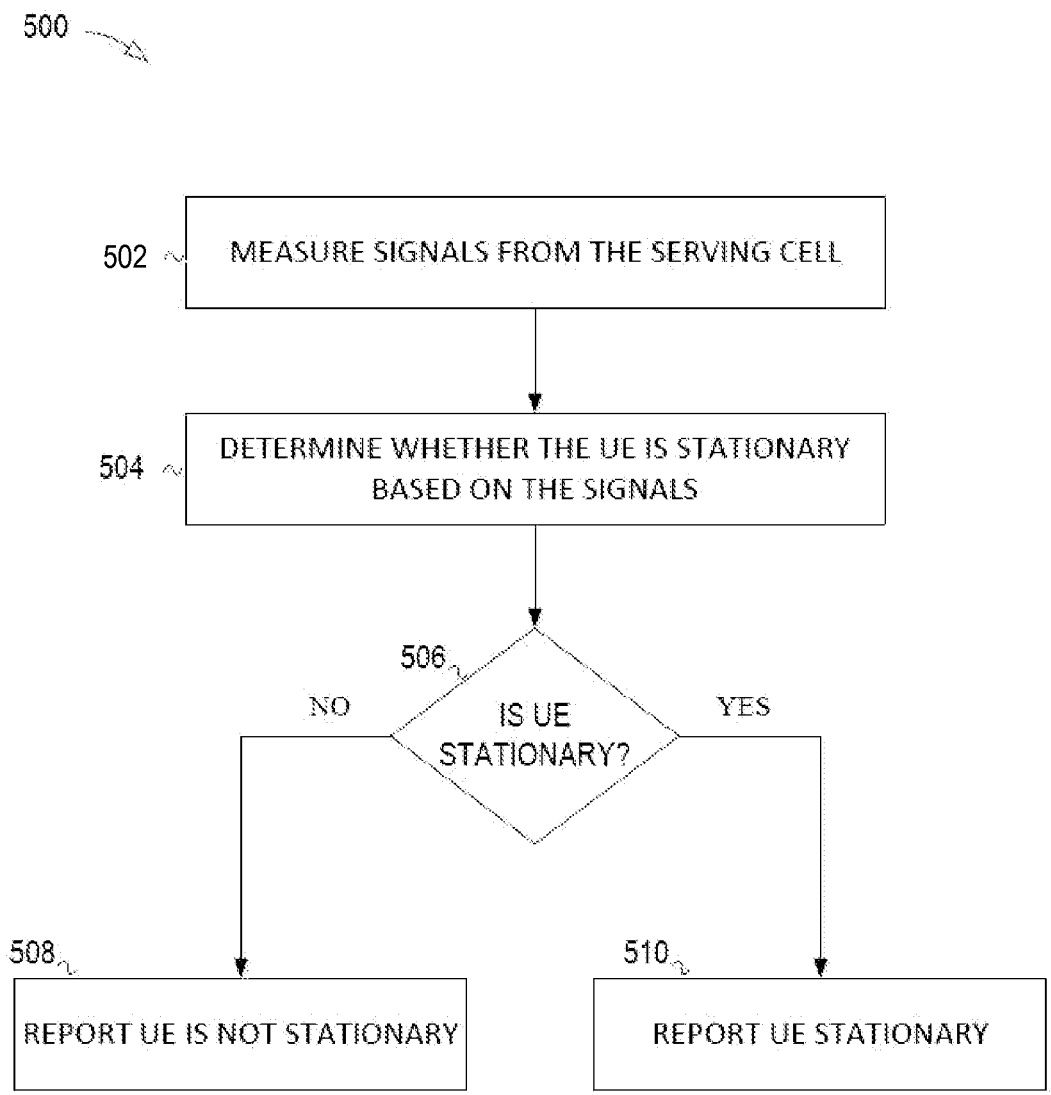
FIG. 5 illustrates a method of determining whether a UE is stationary, in accordance with some embodiments.

FIG. 5 illustrates a method of determining whether a UE is stationary, in accordance with some embodiments. FIG. 5 illustrates a method 500 of determining whether a UE 102 is stationary in accordance with some embodiments. The method 500 may begin at operation 502 with measuring signals from the serving cell (e.g., first cell 240 service UE 202 in operations 212 and 214). For example, the signals may be one or more of a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), a channel quality indication (CQI), or other signal that may be measured by the UE 202 from the first cell 240. In example embodiments, the UE 202 may measure one or more signals from neighboring cells such as second cell 250 and third cell 260 in addition to first cell 240.

The measurements may be part of a sliding window, fixed window, or variable sized window. The size of the window may depend on factors such as how the UE 202 determines whether or not it is stationary. Other factors may include whether the UE 202 is near an edge of the serving cell. In example embodiments, the UE 202 may flush the measurements when the UE 202 changes serving cell, such as in illustrated operations 212, 218, and 224.

In some embodiments, a low pass filter may be used to filter minor errors that may be incurred in measuring the signals from the serving cell or gathering of sensor data used to generate location information that is used for mobility determinations.

The method 500 may continue at operation 504 with determining whether the UE is stationary based on the signals. For example, UE 202 may determine a variance of RSRP or another signal measured by the UE 202 from the first cell 240. The UE 202 may then determine whether or not the UE 202 is stationary based on the value of the variance. The UE 202 may determine that the UE 202 is stationary if the variance is below a threshold level. In example embodiments, the UE 202 may determine an approximate mobility of the UE 202 that may include a speed and/or direction and/or may include a category of mobility such as stationary, low or normal mobility, medium mobility, and high mobility. The UE 202 may use threshold values of the variance that may be predetermined to determine the mobility of the UE 202.

In other embodiments, the UE 102 may determine a standard deviation of RSRP or another signal measured by the UE 202 from the first cell 240 or any other cell or combination of cells. The UE 202 may then determine whether or not the UE 202 is stationary based on the value of the standard deviation. The UE 202 may determine that the UE 202 is stationary if the variance is below a threshold level.

In still other embodiments, two or more of the embodiments disclosed above may be combined. For example, the UE 202 may use a linear combination as disclosed in Equation (5). Equation (5): Metric=$\alpha$*Variance+$\beta$*Standard Deviation+$\gamma$*CI, where $\alpha$, $\beta$, $\gamma$ may be between 0 and 1, and variance, standard deviation, and CI may be determined as described herein.

In still further embodiments, measurements with multiple cells may be used, or measurements on signals to any number of local eNBs may be combined with any number of other location based measurements to generate location information for use in making a stationary determination or mobility determination. In some embodiments, the UE 202 may be configured to measure signals from neighboring cells such as second cell 250 and third cell 260 when the UE 202 is being served from the first cell 240. The UE 202 may determine an offset/difference between the strongest neighboring cell and the serving cell. For example, in one embodiment, when the UE 202 is moving towards the serving cell, RSRP increases while the neighboring cell signal decreases. The UE 202 can then determine whether or not the UE 202 is stationary or mobile based on the determined offset/difference using one of the methods described herein such as a variance, threshold measure, standard deviation, or CI. The measurements from the serving cell and the neighboring cells may include a close measurement error. The offset/difference may provide a reduced error of the measured signals from the serving cell and a more accurate determination of the UE's 202 mobility.

In some embodiments, the UE 202 is configured to measure the signals from two or more neighboring cells. The UE 202 may select two or more neighboring cells that have stronger signals from other neighboring cells. One or more of the methods described herein such as variance, standard deviation, and/or CI may then be used on the measurements from each of the serving cell and the two or more neighboring cells. Using the signals from one neighboring cell may have the technical effect that the UE 202 may be able to determine whether the UE 202 is stationary when the UE 202 is moving in a circle around the serving cell. Moreover, using the signals from two or more neighboring cells may have the technical effect that the UE 202 may be able to determine whether the UE 202 is stationary when the UE 202 is moving in a straight line with the same distance from the serving cell and one neighboring cell.

In still other embodiments, a weighted sum of the signals from the serving cell and an offset/difference may be used. The UE 202 may select to measure the signals of the neighboring cells with the strongest signals. The UE 202 may then determine Equation (6).

Weighted Sum=$w_1 * g(\alpha_i) + w_2 * f(\alpha_i - \beta_i)$, Equation (6):

In Equation (6) $\alpha_i$ is the measure of the serving cell such as first cell 240 at time i, $\beta_i$ is the measure of neighboring cells such as second cell 250 and third cell 260 at time I, and f and g may be one of the methods described herein such as variance, standard deviation, or CI. The UE 202 may then determine the UE's 202 mobility based on the Weighted Sum. For example, if the Weighted Sum is above a threshold, the UE 202 may determine that the UE 202 is not stationary. In example embodiments, the UE 202 may determine an approximate mobility of the UE 202 that may include a speed and/or direction and/or may include a category of mobility such as stationary, low or normal mobility, medium mobility, and high mobility. The UE 202 may use threshold values of the weighted average that may be predetermined to determine the mobility of the UE 202.

The method 500 may continue at operation 506 by the UE determining whether the UE is stationary. For example, the UE 202 may determine whether or not the UE 202 is stationary based on one of the methods described herein. If the UE 202 determines that it is not stationary, the method 500 may continue at operation 508. For example, if the UE 202 is not stationary, the UE 202 may chose different parameters or apply enhancements such as selecting handover parameters based on the UE 202 not being stationary. The UE 202 may send a message to the serving cell indicating that the UE 202 is not stationary.

If the UE 202 determines that it is stationary, the method 500 may continue at operation 510. For example, if the UE 202 is stationary, the UE 202 may use different parameters or apply different enhancement such as handover parameters based on the UE 202 being stationary. In both operation 508 and operation 510, the UE 202 may report the mobility of the UE 202 to the network.

Figure 6:
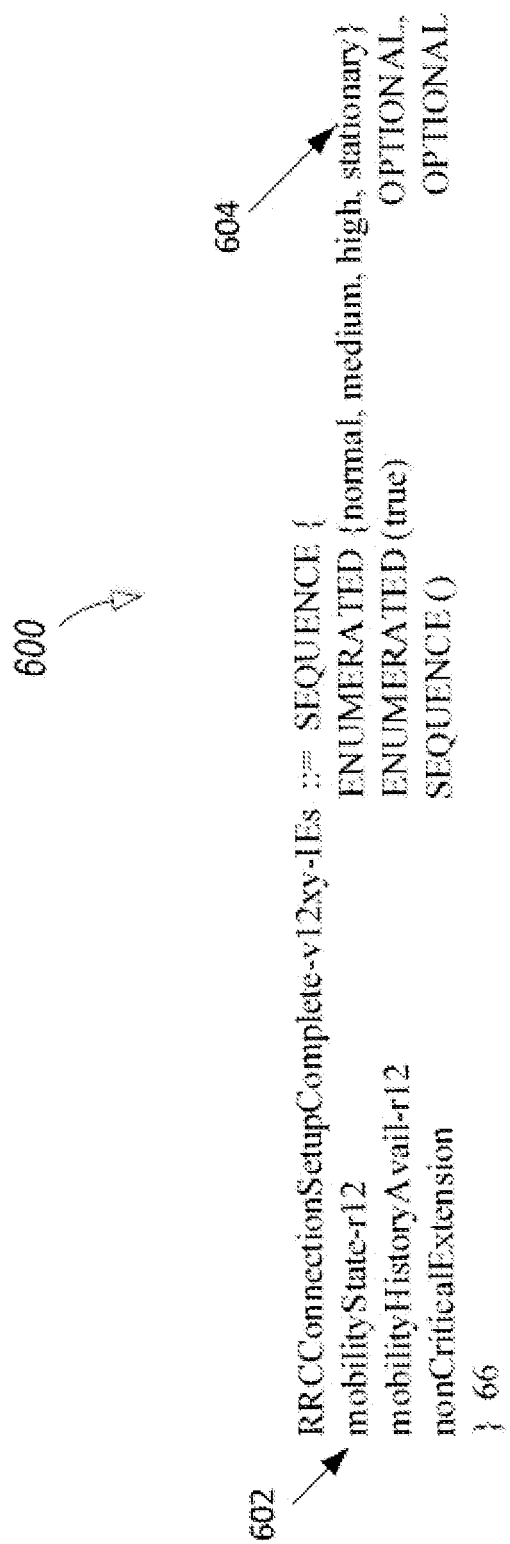
FIG. 6 illustrates an information element in accordance with some embodiments.

FIG. 6 illustrates an information element 600 in accordance with some embodiments. For example, in 3rd Generation Partnership Project (3GPP) RAN2, the UE 102 or UE 202 may send the information element 600 to the network 100 to indicate the mobility 602 of the UE. The UE may be configured to report the mobility 602 of the UE to the network when the UE transitions from radio resource control (RRC) idle to RRC connected mode. The mobility 602 may be represented by two bits with four possible states of normal, medium, high, and stationary 604.

Figure 7:
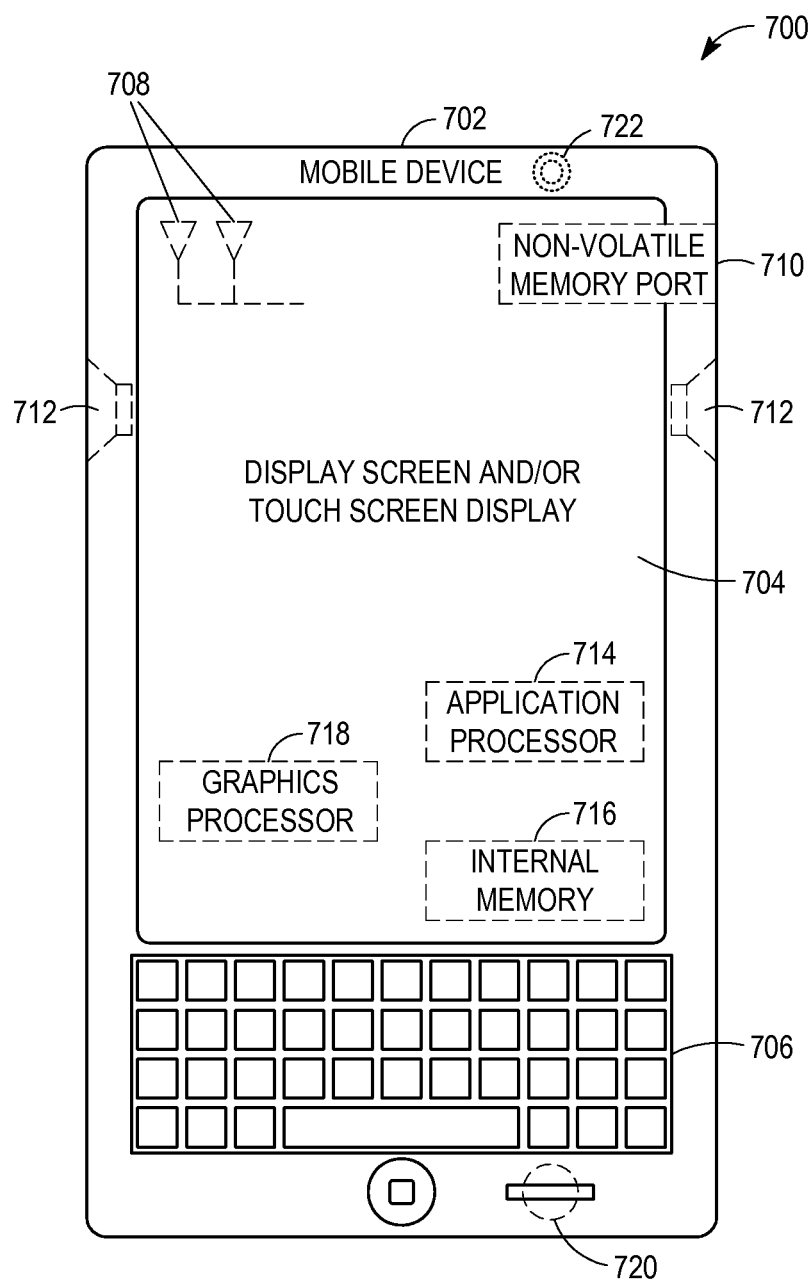
FIG. 7 illustrates a block diagram of an example UE in accordance with some embodiments.

FIG. 7 illustrates a block diagram of an example UE 700 in accordance with some embodiments. In some embodiments, the UE 102 or UE 202 may be implemented as an embodiment of UE 700. In various other embodiments, any UE may use elements of UE 700 and/or machine 800 of FIG. 8. Any UE herein may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, or wearable device etc.), or other device that may receive and/or transmit information wirelessly. In accordance with embodiments, the UE 700 and/or machine 800 may be configured for one or more of the example embodiments described herein for determining the mobility of the UE 700 and for modifying channel measurements for communications with a service cell associated with an eNB.

FIG. 7 illustrates an example of a UE 700. The UE 700 can include one or more antennas 708 within housing 702 that are configured to communicate with a hotspot, base station (BS), an eNB, or other type of WLAN or WWAN access point. UE may thus communicate with a WAN such as the Internet via an eNB or base station transceiver implemented as part of an asymmetric RAN as detailed above. UE 700 can be configured to communicate using multiple wireless communication standards, including standards selected from 3GPP LTE, WiMAX, High Speed Packet Access (HSPA), Bluetooth, and Wi-Fi standard definitions. The UE 700 can communicate using separate antennas for each wireless communication standard or shared antennas for multiple wireless communication standards. The UE 700 can communicate in a WLAN, a WPAN, and/or a WWAN.

FIG. 7 also shows a microphone 720 and one or more speakers 712 that can be used for audio input and output from the UE 700. A display screen 704 can be a liquid crystal display (LCD) screen, or other type of display screen such as an organic light emitting diode (OLED) display. The display screen 704 can be configured as a touch screen. The touch screen can use capacitive, resistive, or another type of touch screen technology. An application processor 714 and a graphics processor 718 can be coupled to internal memory 716 to provide processing and display capabilities. A non-volatile memory port 710 can also be used to provide data input/output options to a user. The non-volatile memory port 710 can also be used to expand the memory capabilities of the UE 700. A keyboard 706 can be integrated with the UE 700 or wirelessly connected to the UE 700 to provide additional user input. A virtual keyboard can also be provided using the touch screen. A camera 722 located on the front (display screen) side or the rear side of the UE 700 can also be integrated into the housing 702 of the UE 700. Any such elements may be used to generate information that may be communicated as uplink data via an asymmetric C-RAN and to receive information that may be communicated as downlink data via an asymmetric C-RAN as described herein.

Figure 8:
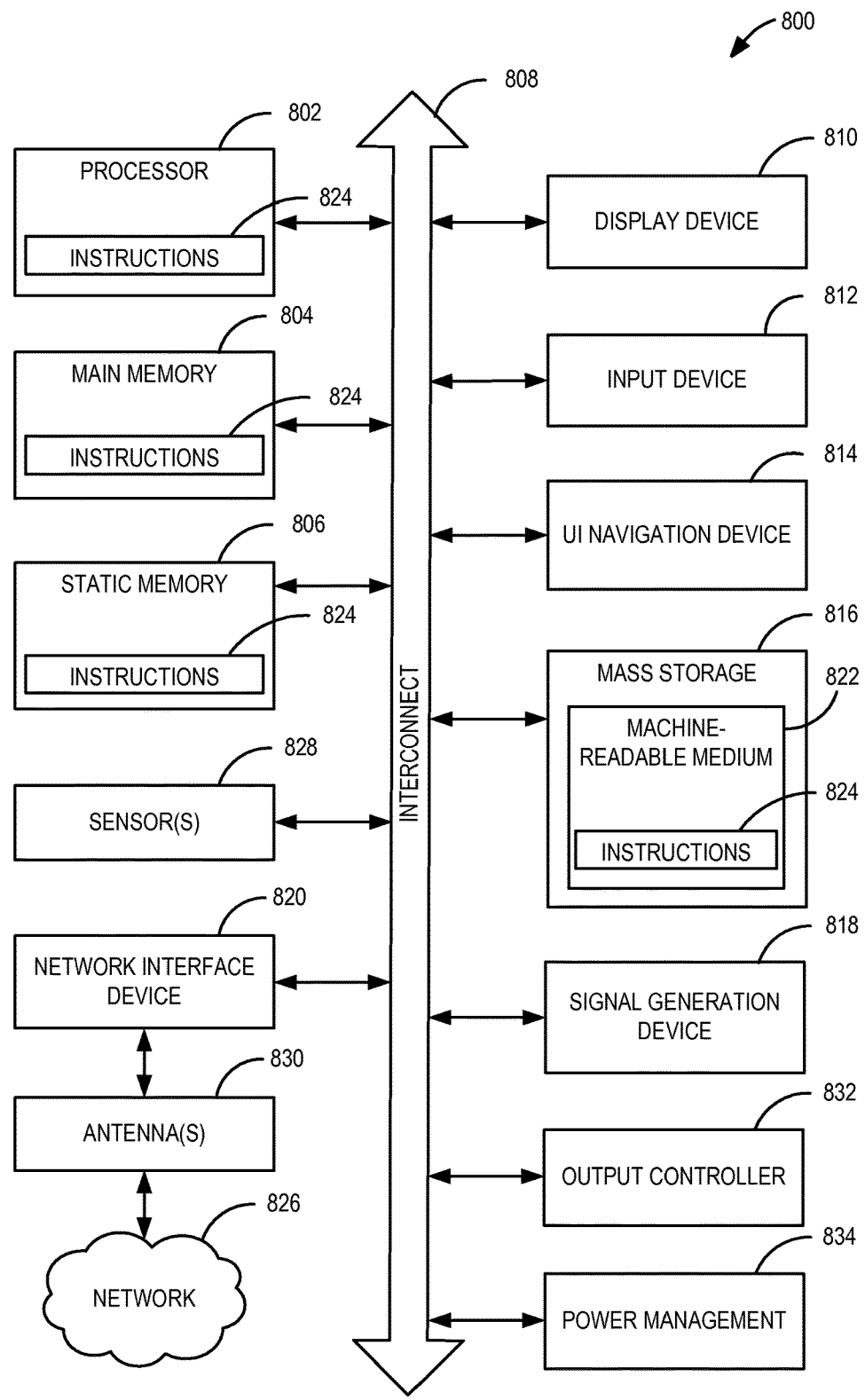
FIG. 8 illustrates a block diagram of a device that may be used to implement various aspects of systems, devices, and methods for modifying cell measurements based on device mobility according to some embodiments.

FIG. 8 illustrates a block diagram of a device that may be used to implement various aspects of systems, devices, and methods for modifying cell measurements based on device mobility according to some embodiments. FIG. 8 illustrates an example computer system machine 800 upon which any one or more of the methodologies herein discussed can be run, including PDN gateway 126, serving gateway 124, MME 122, eNB 104, any machine enabling first cell 240, second cell 250, or third cell 260, UE 700, or any other such device described herein. In various alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 800 includes a processor 802 (e.g., a central processing unit (CPU), a graphics processing unit (GPU) or both), a main memory 804 and a static memory 806, which communicate with each other via an interconnect 808 (e.g., a link, a bus, etc.). The computer system machine 800 can further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are a touch screen display. The computer system machine 800 can additionally include a storage device 816 (e.g., a drive unit), a signal generation device 818 (e.g., a speaker), an output controller 832, a power management controller 834, and a network interface device 820 (which can include or operably communicate with one or more antennas 830, transceivers, or other wireless communications hardware), and one or more sensors 828, such as a Global Positioning Sensor (GPS) sensor, compass, location sensor, accelerometer, or other sensor.

The storage device 816 includes a machine-readable medium 822 on which is stored one or more sets of data structures and instructions 824 (e.g., software) embodying or utilized by any one or more of the methodologies or functions described herein. The instructions 824 can also reside, completely or at least partially, within the main memory 804, static memory 806, and/or within the processor 802 during execution thereof by the computer system machine 800, with the main memory 804, static memory 806, and the processor 802 also constituting machine-readable media.

While the machine-readable medium 822 is illustrated in an example embodiment to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 824 can further be transmitted or received over a communications network 826 using a transmission medium via the network interface device 820 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

Various techniques, or certain aspects or portions thereof may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile station may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Various embodiments may use 3GPP LTE/LTE-A, IEEE 802.11, and Bluetooth communication standards. Various alternative embodiments may use a variety of other WWAN, WLAN, and WPAN protocols and standards can be used in connection with the techniques described herein. These standards include, but are not limited to, other standards from 3GPP (e.g., HSPA+, UMTS), IEEE 802.16 (e.g., 802.16p), or Bluetooth (e.g., Bluetooth 7.0, or like standards defined by the Bluetooth Special Interest Group) standards families. Other applicable network configurations can be included within the scope of the presently described communication networks. It will be understood that communications on such communication networks can be facilitated using any number of personal area networks, LANs, and WANs, using any combination of wired or wireless transmission mediums.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Certain such additional embodiments may comprise user equipment (UE) comprising circuitry configured to: determine a plurality of signals from one or more cells, with each cell associated with an evolved node B (eNB); determine a first value for a first performance metric associated with a first cell of the one or more cells, wherein the first value is determined from a first measurement; select the first cell for a first communication based on the first value; determine first location information associated with the UE; determine, following the first measurement and using the first location information; whether? the UE is stationary; and delay, in response to a determination that the UE is stationary, a second measurement of the first performance metric.

Additional such embodiments may function where the one or more cells comprises the first cell and a second cell; where the first cell comprises a macro cell operating using a first frequency layer; and wherein the second cell comprises a picocell operating using a second frequency layer different than the first frequency layer.

Additional such embodiments may function where the plurality of signals comprises a first signal from the first cell to the UE in the first frequency layer and a second signal from the second cell using the second frequency layer.

Additional such embodiments may function where the circuitry is further configured to: determine a second value for the first performance metric associated with the second cell as part of the first measurement; and where the first cell is further selected based on a comparison between the first value and the second value.

Additional such embodiments may function where the circuitry configured to determine the plurality of signals comprises circuitry configured to: determine the plurality of signals from the first cell, where the plurality of signals is at least one from the following group: a reference signal receive power (RSRPs), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI.)

Additional such embodiments may function where the circuitry configured to determine that the UE is stationary comprises circuitry configured to determine one or more measures a window size of each of the plurality of the signals, where the one or more measures is at least one from the following group: a variance of the one or more signal values, a standard deviation of the one or more signal values, a percent confidence interval (CI) of a mean of the one or more measures, and a linear combination of two or more other of the one or more measures.

Additional such embodiments may function where the first performance metric is a Doppler threshold associated with at least one of the plurality of signals.

Additional such embodiments may function where the circuitry configured to determine that the UE is stationary comprises circuitry configured to: transmit the first location information to an evolved node B (eNB) and receive, in response to transmission of the first location information, a measurement delay indicator.

Additional such embodiments may function where the circuitry configured to delay, in response to the determination that the UE is stationary, the second measurement of the first performance metric comprises circuitry configured to process the measurement delay indicator as an indicator that the UE is stationary.

Additional such embodiments may function where the first location information is transmitted to a mobility management entity (MME) via the eNB; where the MME determines, based on the first location information, that the UE is stationary; and where the MME initiates the measurement delay indicator in response to the determination by the MME that the UE is stationary.

Additional such embodiments may function where the circuitry configured to determine, following the first measurement and using the first location information, that the UE is stationary comprises circuitry configured to: determine a mobility value for the UE using the first location information; identify a stationary threshold; and determine that the mobility value is below the stationary threshold.

Additional such embodiments may further comprise circuitry configured to: determine second location information associated with the UE, where the first location information is determined during a first time period, and where the second location information is determined during a second time period that is after the first time period; determine, following the second measurement and using the second location information, that the UE is not stationary; and initiating, in response to the determination that the UE is stationary, the second measurement of the first performance metric.

Additional such embodiments may function where the circuitry configured to determine, following the second measurement and using the second location information, that the UE is not stationary comprises circuitry configured to: determine a second mobility value for the UE using the second location information; and determine that the mobility value is above the stationary threshold.

Additional such embodiments may comprise circuitry configured to communicate a stationary determination message based on the determination that the mobility value is below the stationary threshold; and receive a measurement delay communication in response to communication of the stationary determination message.

Additional such embodiments may further comprise an antenna, where the stationary determination message is transmitted via an air interface to an evolved node B (eNB) using the antenna, and where the measurement delay communication is received via the air interface from the eNB using the antenna.

Additional such embodiments may function where the circuitry is further configured to, based on the selection of the first cell, periodically determine a value for the first performance metric associated with the first cell following the determination that the UE is stationary; where the delay, in response to the determination that the UE is stationary, of the second measurement comprises delaying a determination of a second value for the first performance metric associated with a second cell of the one or more cells that is different than the first cell.

Additional embodiments may include a method for selecting a first cell comprising: determining, by a user equipment (UE) comprising processing circuitry and wireless communication circuitry, a plurality of wireless signals from a plurality of cells; determining a first signal quality for a first cell of the plurality of cells, where the first signal quality is determined from a first measurement of a first wireless signal; determining a second signal quality for a second cell of the plurality of cells, where the second signal quality is determined from a second measurement of a second wireless signal; selecting the first cell for a first communication based a comparison of the second signal quality to the first signal quality; determining first location information associated with the UE; and delaying, based on the first location information a third measurement for a third signal quality determination.

Additional such embodiments may further operate by following determination of the first location information, communicating a first mobility communication from the UE to a mobility management entity (MME); and prior to delaying the third measurement, receiving, from the MME, a measurement delay communication in response to the first mobility communication.

Additional such embodiments may further operate by determining a plurality of signals from the first cell, where each signal of the plurality of signals is at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI); determining a second plurality of signals from the second cell, where each signal of the second plurality of signals is at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI); determining a plurality of offsets between each signal of the plurality of signals from the first cell and the corresponding signal of the second plurality of signals from the second cell; determining one or more measures for each of a window size of the plurality of offsets, where each measure of the one or more measures is at least one from the following group: a variance of the plurality of offsets, a standard deviation of the plurality of offsets, a percent confidence interval (CI) of a mean of the plurality of offsets, and a linear combination of two or more of the one or more measures; and determining whether the UE is stationary based on the one or more measures.

Additional such embodiments may further operate by determining that the UE is stationary if the one or more measures is the variance of the plurality of signals and the variance of the plurality of signals is lower than a threshold variance.

Additional such embodiments may further operate by determining whether the UE is at an edge of the serving cell; and using a first number for the window size if the UE is at the edge of the serving cell and using a second number for the window size if the UE is not at the edge of the serving cell.

Additional such embodiments may further operate by determining that the UE is stationary if the one or more measures is the standard deviation of the plurality of signals and the standard deviation of the plurality of signals is below a threshold standard deviation.

An additional embodiment may be a non-transitory computer readable medium comprising computer readable instructions that, when executed by one or more processors, causes a user equipment (UE) to measure a first signal quality for a first connection from the UE to a first cell; measure a second signal quality for a second connection from the UE to a second cell; measure a mobility of the UE; and adjust, based on the mobility of the UE, a subsequent signal quality measurement based on the mobility of the UE.

Additional such embodiments may further operate where the instructions further cause the UE to: measure a third signal quality for a third connection to a third cell, where the third cell is different from the first cell and the second cell; where adjusting the subsequent signal quality measurement comprises delaying a fourth signal quality for the first connection, a fifth signal quality for the second connection, and a sixth signal quality for the third connection.

Additional such embodiments may further operate where the instructions further cause the UE to: communicate the mobility of the UE to a mobility management entity (MME); and receive from the MME a measurement control communication; where the subsequent signal quality is adjusted in response to the measurement control communication from the MME.

What is claimed is:

1. A user equipment (UE) comprising:
   an interface configured to receive a plurality of signals from one or more cells, with each cell associated with an evolved node B (eNB); and
   circuitry configured to:
   determine the plurality of signals from one or more cells;
   determine a first value for a first performance metric associated with a first cell of the one or more cells, wherein the first value is determined from a first measurement;
   select the first cell for a first communication based on the first value;
   determine first location information associated with the UE;
   determine, following the first measurement and using the first location information, whether the UE is stationary;
   delay, in response to a determination that the UE is stationary, a second measurement of the first performance metric;
   based on the selection of the first cell, periodically determine a value for the first performance metric associated with the first cell following the determination that the UE is stationary;
   wherein the delay, in response to the determination that the UE is stationary, of the second measurement comprises delaying a determination of a second value for the first performance metric associated with a second cell of the one or more cells that is different than the first cell.

2. The UE of claim 1, wherein the one or more cells comprises the first cell and the second cell;
   wherein the first cell comprises a macro cell operating using a first frequency layer; and
   wherein the second cell comprises a picocell operating using a second frequency layer different than the first frequency layer.

3. The UE of claim 2 wherein the plurality of signals comprises a first signal from the first cell to the UE in the first frequency layer and a second signal from the second cell using the second frequency layer.

4. The UE of claim 3 wherein the circuitry is further configured to:
   determine the second value for the first performance metric associated with the second cell as part of the first measurement; and
   wherein the first cell is further selected based on a comparison between the first value and the second value.

5. The UE of claim 1, wherein the circuitry configured to determine the plurality of signals comprises circuitry configured to:
   determine the plurality of signals from the first cell, wherein the plurality of signals is at least one from the following group: a reference signal receive power (RSRPs), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI).

6. The UE of claim 5 wherein the circuitry configured to determine that the UE is stationary comprises circuitry configured to determine one or more measures of a window size for each of the plurality of the signals, wherein the one or more measures is at least one from the following group: a variance of one or more signal values, a standard deviation of the one or more signal values, a percent confidence interval (CI) of a mean of the one or more measures, and a linear combination of two or more other of the one or more measures.

7. The UE of claim 1 wherein the first performance metric is a Doppler threshold associated with at least one of the plurality of signals.

8. The UE of claim 1 wherein the circuitry configured to determine that the UE is stationary comprises circuitry configured to:
   transmit the first location information to an evolved node B (eNB); and
   receive, in response to transmission of the first location information, a measurement delay indicator.

9. The UE of claim 8 wherein the circuitry configured to delay, in response to the determination that the UE is stationary, the second measurement of the first performance metric comprises circuitry configured to process the measurement delay indicator as an indicator that the UE is stationary.

10. The UE of claim 9 wherein the first location information is transmitted to a mobility management entity (MME) via the eNB;
    wherein the MME determines, based on the first location information, that the UE is stationary; and
    wherein the MME initiates the measurement delay indicator in response to the determination by the MME that the UE is stationary.

11. The UE of claim 1 wherein the circuitry configured to determine, following the first measurement and using the first location information, that the UE is stationary comprises circuitry configured to:
    determine a mobility value for the UE using the first location information;
    identify a stationary threshold; and
    determine that the mobility value is below the stationary threshold.

12. The UE of claim 11 further comprising circuitry configured to:
    determine second location information associated with the UE, wherein the first location information is determined during a first time period, and wherein the second location information is determined during a second time period that is after the first time period;
    determine, following the second measurement and using the second location information, that the UE is not stationary; and
    initiating, in response to the determination that the UE is stationary and following the delay, the second measurement of the first performance metric.

13. The UE of claim 12 wherein the circuitry configured to determine, following the second measurement and using the second location information, that the UE is not stationary comprises circuitry configured to:
    determine a second mobility value for the UE using the second location information; and
    determine that the mobility value is above the stationary threshold.

14. The UE of claim 11 further comprising circuitry configured to:
    communicate a stationary determination message based on the determination that the mobility value is below the stationary threshold; and
    receive a measurement delay communication in response to communication of the stationary determination message.

15. The UE of claim 11 further comprising an antenna, wherein the stationary determination message is transmitted via an air interface to an evolved node B (eNB) using the antenna, and wherein the measurement delay communication is received via the air interface from the eNB using the antenna.

16. The UE of claim 1 further comprising one or more antennas coupled to the interface and configured to transmit and receive data from the one or more cells.

17. The UE of claim 16 further comprising a memory configured to store instructions for execution by one or more processors coupled to the memory, the circuitry, and the one or more antennas.

18. The UE of claim 17 further comprising a display device coupled to the one or more processors and configured to display data received from at least a first cell of the one or more cells via the one or more antennas.

19. A method for selecting a first cell comprising:
    determining, by a user equipment (UE) comprising processing circuitry and wireless communication circuitry, a plurality of wireless signals from a plurality of cells;
    determining a first signal quality for a first cell of the plurality of cells, wherein the first signal quality is determined from a first measurement of a first wireless signal;
    determining a second signal quality for a second cell of the plurality of cells, wherein the second signal quality is determined from a second measurement of a second wireless signal;
    selecting the first cell for a first communication based on a comparison of the second signal quality to the first signal quality;
    determining first location information associated with the UE; and
    delaying, based on the first location information a third measurement for a third signal quality determination;
    determining a plurality of signals from the first cell, wherein each signal of the plurality of signals is at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI);
    determining a second plurality of signals from the second cell, wherein each signal of the second plurality of signals is at least one from the following group: a reference signal receive power (RSRP), a reference signal receive quality (RSRQ), a received signal strength indicator (RSSI), a signal-to-noise ratio (SNR), a signal-to-interference-ratio (SIR), a signal-to-interference-plus-noise ratio (SINR), and a channel quality indication (CQI);
    determining a plurality of offsets between each signal of the plurality of signals from the first cell and the corresponding signal of the second plurality of signals from the second cell;
    determining one or more measures for each of a window size of the plurality of offsets, wherein each measure of the one or more measures is at least one from the following group: a variance of the plurality of offsets, a standard deviation of the plurality of offsets, a percent confidence interval (CI) of a mean of the plurality of offsets, and a linear combination of two or more of the one or more measures; and
    determining whether the UE is stationary based on the one or more measures.

20. The method of claim 19 further comprising:
following determination of the first location information, communicating a first mobility communication from the UE to a mobility management entity (MME); and
prior to delaying the third measurement, receiving, from the MME, a measurement delay communication in response to the first mobility communication.

21. The method of claim 19, further comprising:
determining that the UE is stationary if the one or more measures is the variance of the plurality of signals and the variance of the plurality of signals is lower than a threshold variance.

22. The method of claim 19, further comprising:
determining whether the UE is at an edge of the serving cell; and
using a first number for the window size if the UE is at the edge of the serving cell and using a second number for the window size if the UE is not at the edge of the serving cell.

23. The method of claim 19, further comprising:
determining that the UE is stationary if the one or more measures is the standard deviation of the plurality of signals and the standard deviation of the plurality of signals is below a threshold standard deviation.

24. A non-transitory computer readable medium comprising computer readable instructions that, when executed by one or more processors, causes a user equipment (UE) to:
measure a first signal quality for a first connection from the UE to a first cell;
measure a second signal quality for a second connection from the UE to a second cell;
measure a mobility of the UE;
adjust, based on the mobility of the UE, a subsequent signal quality measurement based on the mobility of the UE; and
measure a third signal quality for a third connection to a third cell, wherein the third cell is different from the first cell and the second cell;
wherein adjusting the subsequent signal quality measurement comprises delaying a fourth signal quality for the first connection, a fifth signal quality for the second connection, and a sixth signal quality for the third connection.

25. The non-transitory computer readable medium of claim 24 wherein the instructions further cause the UE to:
communicate the mobility of the UE to a mobility management entity (MME); and
receive from the MME a measurement control communication;
wherein the subsequent signal quality is adjusted in response to the measurement control communication from the MME.

* * * * *